May 5, 1931.    L. L. E. CROWE    1,804,321
PULSATION CONTROL
Filed June 22, 1928    2 Sheets-Sheet 1

Lloyd L. E. Crowe
INVENTOR

BY Victor J. Evans
ATTORNEY

WITNESS:

May 5, 1931.                L. L. E. CROWE                1,804,321
PULSATION CONTROL
Filed June 22, 1928     2 Sheets-Sheet 2
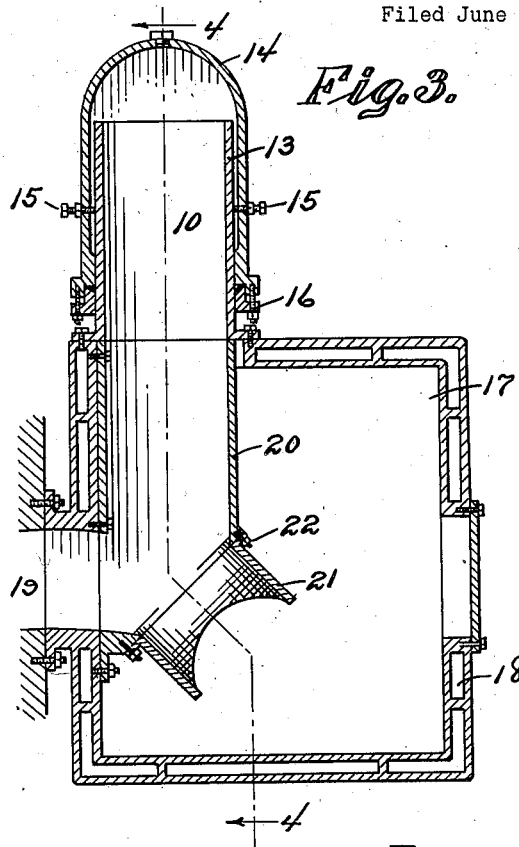
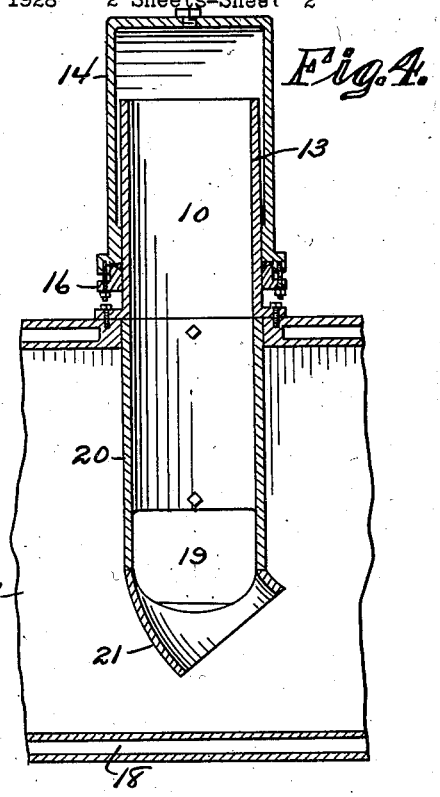
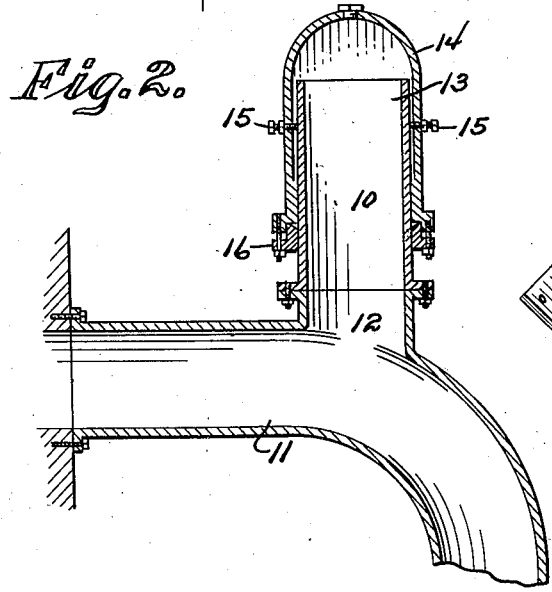
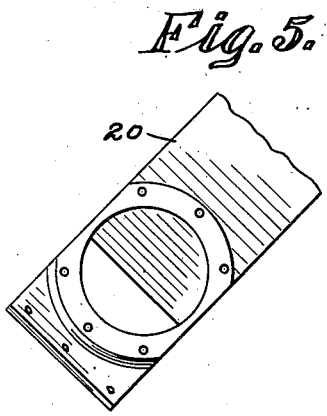
Lloyd L. E. Crowe
INVENTOR
BY Victor J. Evans
ATTORNEY
WITNESS: John Donovan Patented May 5, 1931

1,804,321

UNITED STATES PATENT OFFICE

LLOYD L. E. CROWE, OF MILWAUKEE, WISCONSIN

PULSATION CONTROL

Application filed June 22, 1928. Serial No. 287,473.

This invention relates to internal combustion engines of the two cycle type and has for an object the provision of means for controlling the pulsations or surges of the incoming air for the fuel mixture in engines having air intake ports, and for controlling the pulsations or surges of the exhaust gases for engines taking air through the crank case, as well as for engines of the type first referred to which employ separate air intake ports.

With the above and other objects in view, the invention further includes the following novel features and details of construction, to be hereinafter more fully described, illustrated in the accompanying drawings and pointed out in the appended claim.

In the drawings:—

Figure 2 is an enlarged vertical sectional view taken longitudinally through the exhaust pipe.

Figure 3 is a sectional view showing a modified form of the invention wherein the exhaust pipe is provided with a water jacket.

Figure 4 is a section on the line 4—4 of Figure 3.

Figure 5 is a fragmentary view showing the lower end of the vacuum chamber with the elbow removed.

In engines of the two cycle type, the exhaust gases leave the cylinder and pass out through the exhaust pipe, leaving behind them a partial vacuum. This is quickly followed by a surge back and a portion of the gases rushes into this vacuum and prevents thorough scavenging of the engine cylinder.

This backward and forward surge or pulsation of the exhaust gases is taken care of in the present invention by providing a vacuum chamber 10 which is connected in the exhaust pipe 11 of the engine and extends from said pipe.

As the exhaust gases rush past the opening 12 at the inner end of the vacuum chamber 10, a partial vacuum is created within this chamber due to the suction behind the gases. When a back surge occurs, the returning gases will rush into the chamber 10 in which a partial vacuum has been created and will thus be prevented from reaching the exhaust port of the engine. The next outward surge or impulse of the gases will recreate this partial vacuum within the chamber 10 and the operation will be repeated. Free outward travel of the exhaust gases will thus be insured.

Figure 1:
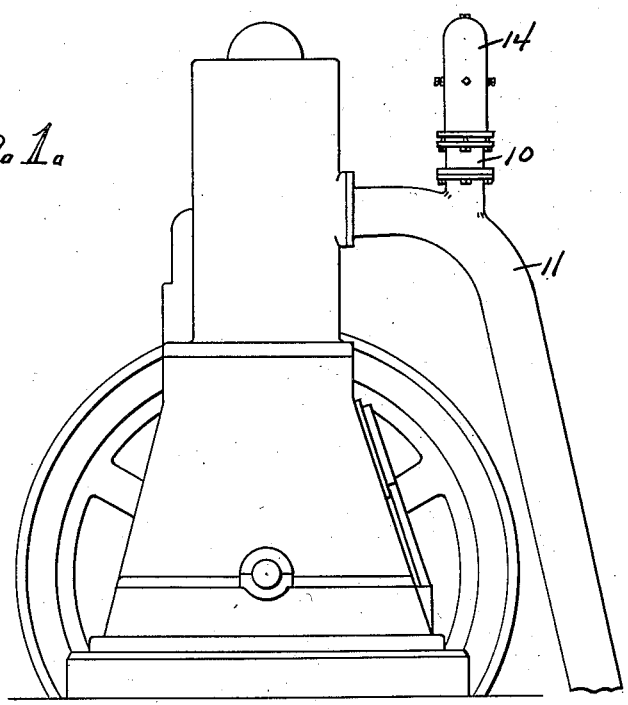
Figure 1 is an elevation of a two cycle internal combustion engine having its exhaust pipe equipped with the invention, the invention being of the type which takes air through the crank case.
Figure 6:
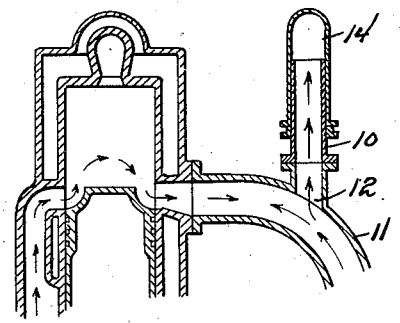
Figure 6 is a diagram illustrating the action of the air entering the engine cylinder and the returning pulsation of the exhaust gases when the piston is at the beginning of its compression stroke.
Figure 7:
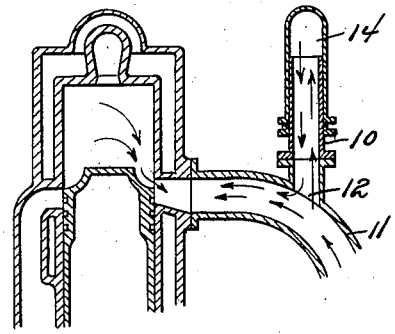
Figure 7 is a like view with the inlet port closed and the outlet port partly open.

As shown in Figure 6 of the drawings, air enters the engine cylinder with the inlet and outlet ports open, the exhaust gases having just left the cylinder so that a partial vacuum has been created within the chamber 10 due to the suction of the exhaust gases passing outward through the exhaust pipe. The back surge of the exhaust gases will fill the chamber 10 and will also enter that portion of the exhaust pipe between the chamber 10 and the engine cylinder. The piston is now moving upward on the compression stroke, closing the inlet port before the outlet port is fully closed. During this movement of the piston, the returning exhaust gases which have entered the chamber 10 from the exhaust pipe, build up a wall or barrier upon the outside of the partly closed outlet port and oppose the outflow of air under compression through said port, there being in effect opposing pressures upon opposite sides of the outlet port so that the full charge of air is retained within the cylinder.

In order to regulate the capacity of the chamber 10 in accordance with the needs and requirements of the engine, the chamber comprises an inner stationary section 13 and an outer relatively movable section 14. The section 14 is adjustably mounted upon the section 13 and is held in adjusted position through the medium of set screws 15. The end of the section 14 which surrounds the section 13 is provided with a packing gland 16 so as to form a leakproof joint.

In Figure 3, the vacuum chamber 10 extends from an exhaust pipe 17 and the latter is provided with a water jacket 18 so as to cool the pipe. The exhaust port 19 of the engine is in communication with the vacuum chamber 10 through a pipe 20 and extending from the lower open end of this pipe is an elbow 21. As shown in Figure 4, this elbow is curved and its inner end is bolted to the pipe 20 as shown at 22. The elbow may thus be removed from the pipe and be arranged to extend in a direction opposite to that shown in Figure 4, if desired.

It is of course apparent that the chamber 10 may be non-adjustable, in which case its capacity would be regulated in accordance with the character of the engine. It may also be found desirable to provide a water jacket on both the adjustable and non-adjustable forms of the chamber 10.

The invention is susceptible of various changes in its form, proportions and minor details of construction and the right is herein reserved to make such changes as properly fall within the scope of the appended claim.

Having described the invention what is claimed is:

In an internal combustion engine, a cylinder having inlet and exhaust ports, an exhaust pipe leading from the exhaust port, a vacuum chamber within the exhaust pipe and having communication with the exhaust port, and adjustable means providing communication between the exhaust port and pipe and the vacuum chamber and pipe to control the direction of travel of the exhaust gases.

In testimony whereof I affix my signature.

LLOYD L. E. CROWE.